United States Patent
Georg et al.

(10) Patent No.: US 8,439,670 B2
(45) Date of Patent: May 14, 2013

(54) DEVICE FOR SEPARATING A SOLID MATERIAL AND A GAS AND A PLANT FOR CEMENT MANUFACTURE

(75) Inventors: Verena Georg, Hamm (DE); Detlev Kupper, Telgte (DE); Luis Lagar Garcia, Oviedo (ES); Andreas Hoppe, Lippstadt (DE); Heinz-Werner Thiemeyer, Ennigerloh (DE); Daniel Klegraf, Rüthen-Westereiden (DE); Thomas Deck, Ennigerloh (DE); Stefanie Richter, Detmold (DE)

(73) Assignee: Polysius AG, Beckum (DE)

( * ) Notice: Subject to any disclaimer, the term of this patent is extended or adjusted under 35 U.S.C. 154(b) by 440 days.

(21) Appl. No.: 12/672,525

(22) PCT Filed: Jun. 25, 2008

(86) PCT No.: PCT/EP2008/058105
§ 371 (c)(1),
(2), (4) Date: Jul. 13, 2010

(87) PCT Pub. No.: WO2009/019072
PCT Pub. Date: Feb. 12, 2009

(65) Prior Publication Data
US 2011/0209449 A1    Sep. 1, 2011

(30) Foreign Application Priority Data
Aug. 7, 2007  (DE) .......................... 10 2007 037 281

(51) Int. Cl.
| | |
|---|---|
| *F27B 7/20* | (2006.01) |
| *F27D 17/00* | (2006.01) |
| *F27D 7/00* | (2006.01) |
| *F27D 7/06* | (2006.01) |
| *B01D 45/12* | (2006.01) |
| *B01D 45/16* | (2006.01) |

(52) U.S. Cl.
USPC .................... 432/69; 55/345; 55/461; 432/67

(58) Field of Classification Search .................... 55/315, 55/315.1, 315.2, 342, 343.1, 342.2, 343, 55/345, 434, 434.2–434.4, 442, 446, 461; 96/372–378; 65/495–497; 432/2, 67, 69; 588/251
See application file for complete search history.

(56) References Cited

U.S. PATENT DOCUMENTS
2,878,891 A * 3/1959 Ross et al. ...................... 96/377
4,004,876 A * 1/1977 Sylvest .......................... 432/14
(Continued)

FOREIGN PATENT DOCUMENTS
DE    3612031 A1    10/1987

*Primary Examiner* — Duane Smith
*Assistant Examiner* — Sonji Turner
(74) *Attorney, Agent, or Firm* — Gifford, Krass, Sprinkle, Anderson & Citkowski, P.C.

(57) ABSTRACT

The device according to the invention for separating a solid material and a gas substantially comprises an ascending conduit for conducting a gas-solid material suspension having a solid material supply port for feeding in a solid material and a gas supply port for feeding in a gas, a descending helical and/or spiral conduit, in which the gas-solid material suspension is separated into a solid material flow and a gas flow by centrifugal forces, a diverter head that connects the ascending conduit with the helical and/or spiral conduit, wherein in the region of the diverter head at least one bend is provided in the conduit configuration, connected to the end of the helical and/or spiral conduit a solid material conduit for discharging the flow of solid material and also connected to the end of the helical and/or spiral conduit a gas conduit for discharging the flow of gas.

11 Claims, 9 Drawing Sheets

U.S. PATENT DOCUMENTS

Figure 8:
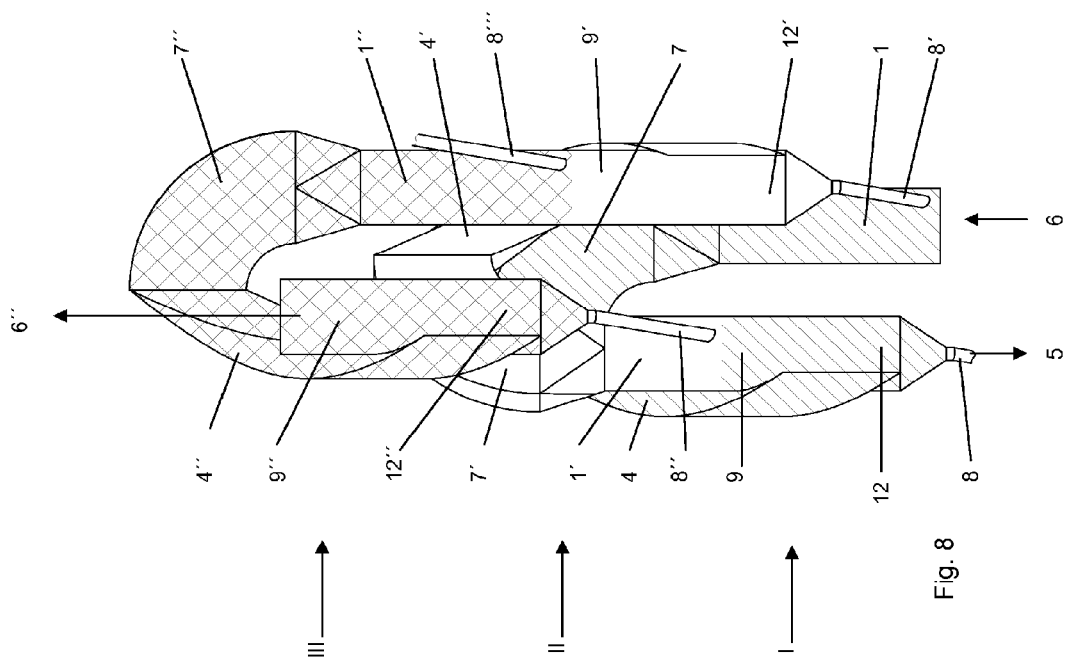

| | | | |
|---|---|---|---|
| 4,014,641 A * | 3/1977 | Shigeyoshi et al. | 432/58 |
| 4,028,049 A * | 6/1977 | Naudy et al. | 432/14 |
| 4,081,285 A * | 3/1978 | Pennell | 106/740 |
| 4,201,546 A * | 5/1980 | Herchenbach et al. | 432/106 |
| 4,288,235 A * | 9/1981 | Gartside et al. | 55/434.1 |
| 4,299,564 A * | 11/1981 | Herchenbach et al. | 432/106 |
| 4,318,692 A | 3/1982 | Hess | |
| 4,470,849 A * | 9/1984 | Abelitis et al. | 106/750 |
| 4,530,661 A * | 7/1985 | Herchenbach et al. | 432/106 |
| 4,606,739 A * | 8/1986 | Brannstrom | 95/271 |
| 4,747,879 A * | 5/1988 | Wolter et al. | 106/759 |
| 4,913,742 A * | 4/1990 | Kwech | 106/745 |
| 4,934,281 A * | 6/1990 | Engstrom et al. | 110/216 |
| 5,098,285 A * | 3/1992 | Bauer | 432/14 |
| 6,012,918 A * | 1/2000 | Doumet | 432/106 |
| 6,210,154 B1 * | 4/2001 | Evans et al. | 432/106 |
| 6,213,764 B1 | 4/2001 | Evans | |
| 6,254,382 B1 * | 7/2001 | Ramesohl et al. | 432/14 |
| 6,524,099 B2 * | 2/2003 | Ramesohl et al. | 432/106 |

* cited by examiner

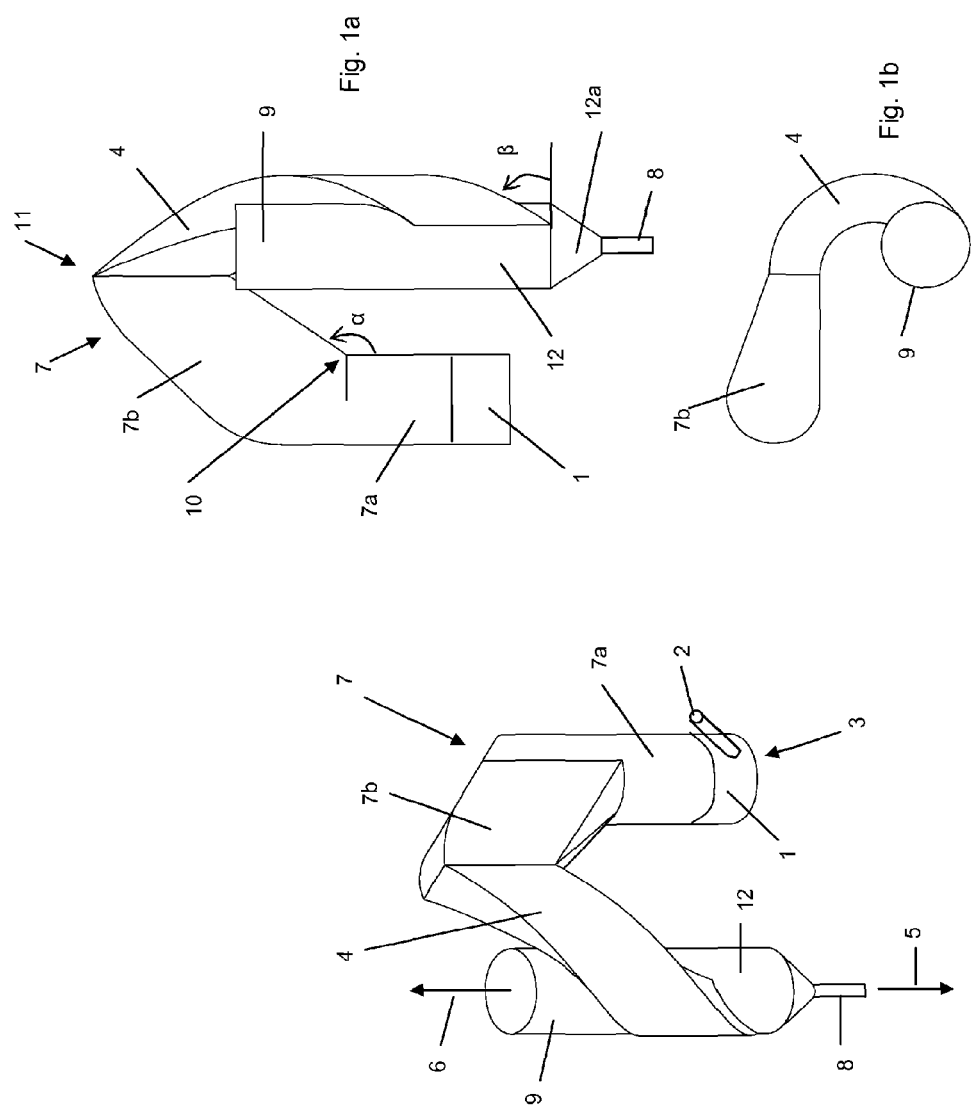

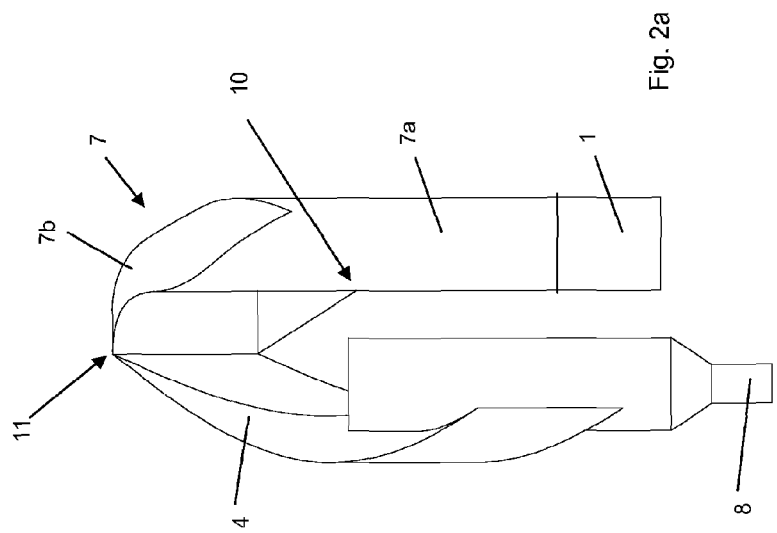
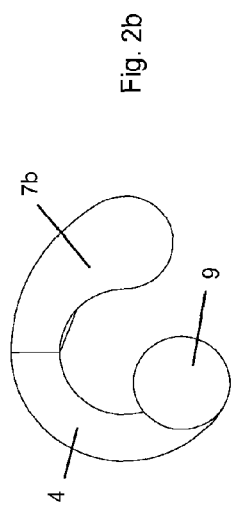
Fig. 2a
Fig. 2b
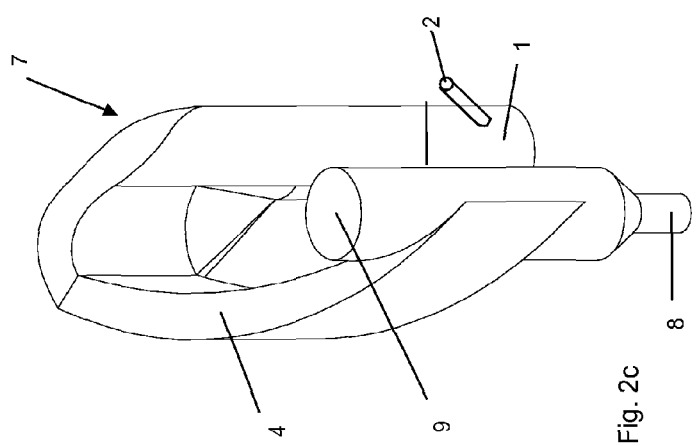
Fig. 2c

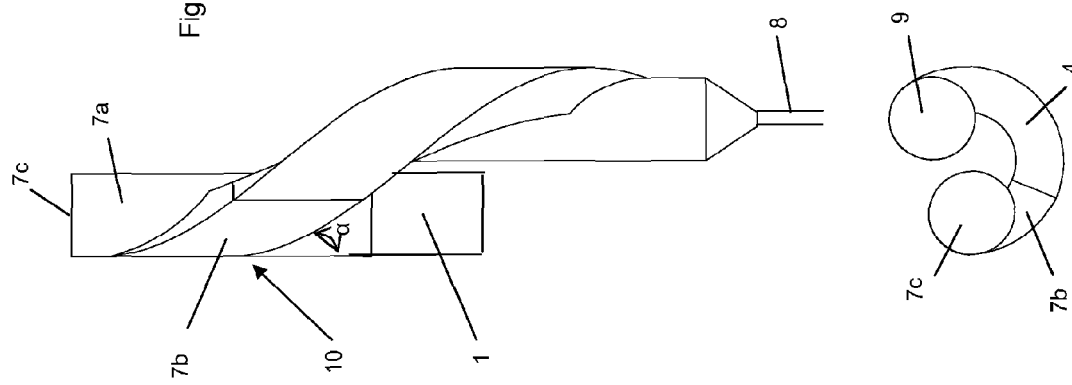
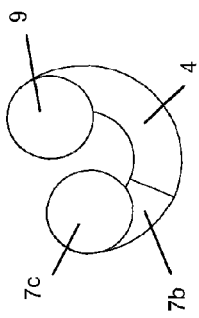
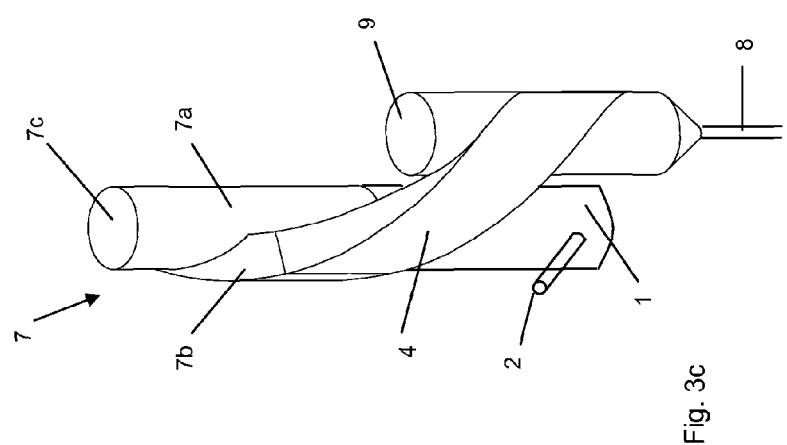

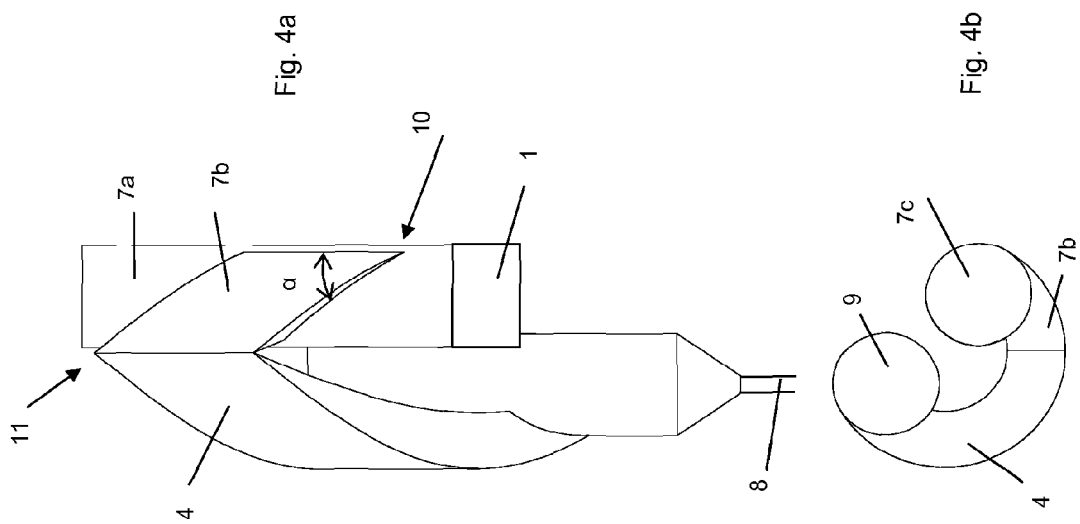
Fig. 4a
Fig. 4b
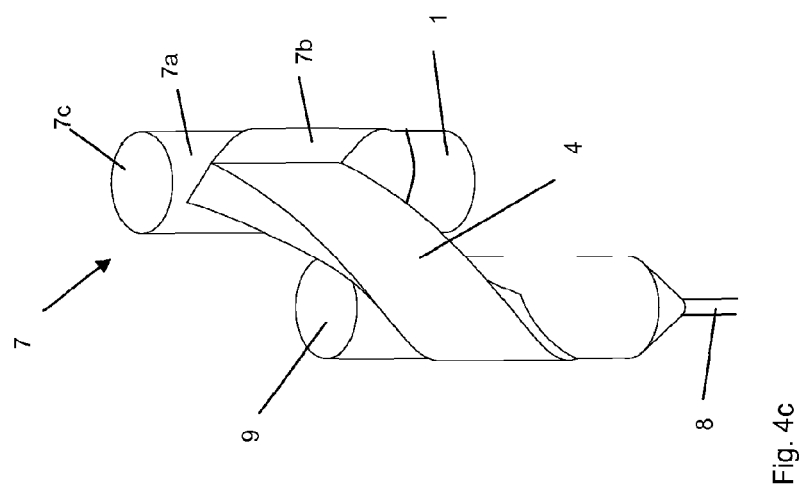
Fig. 4c

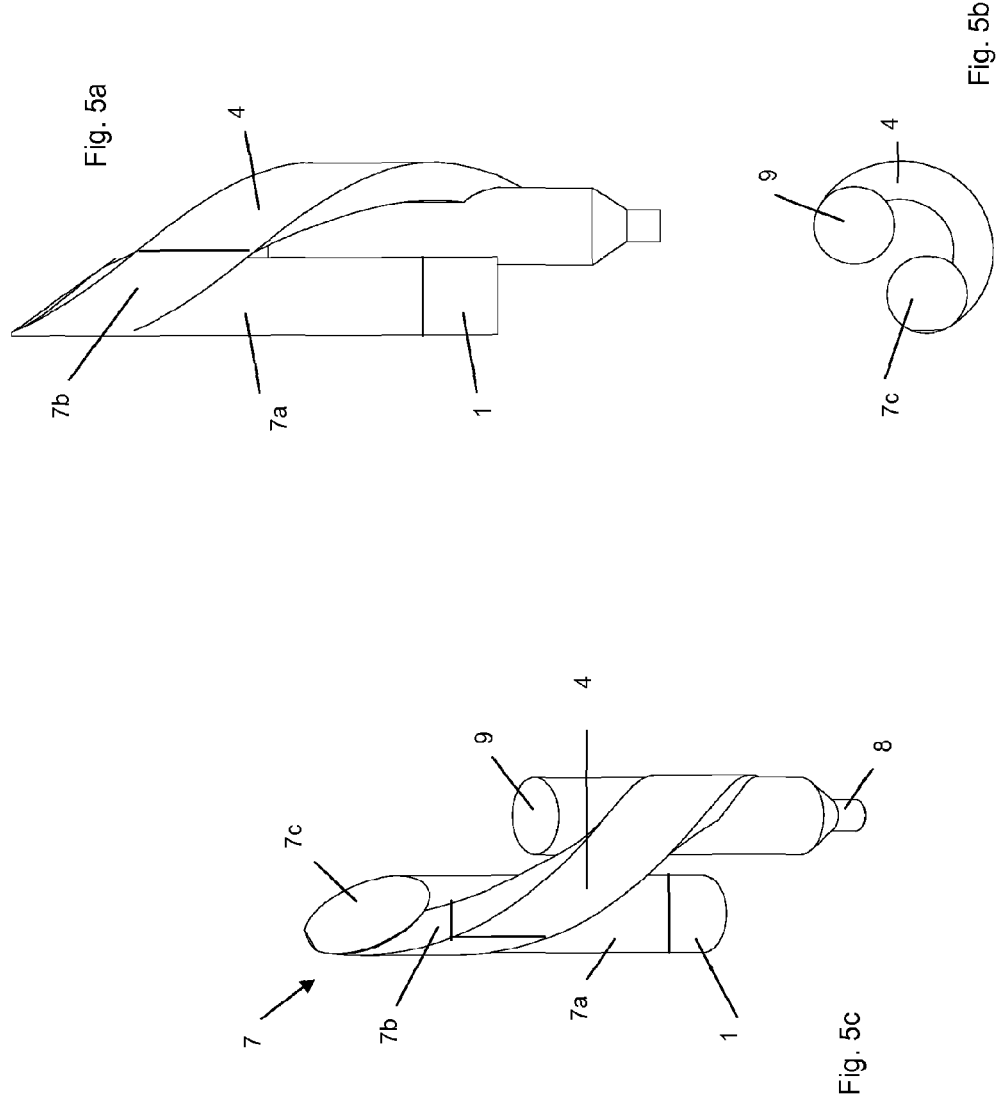

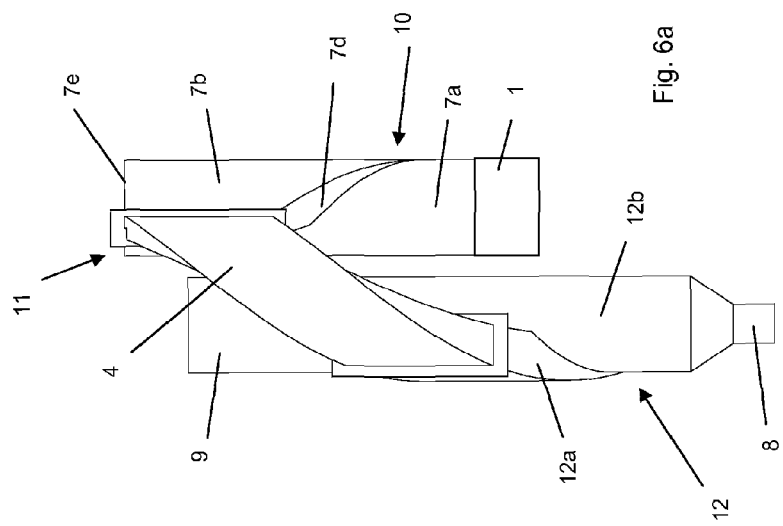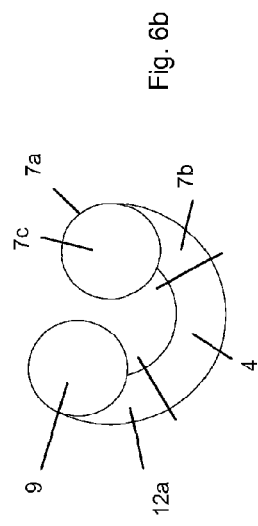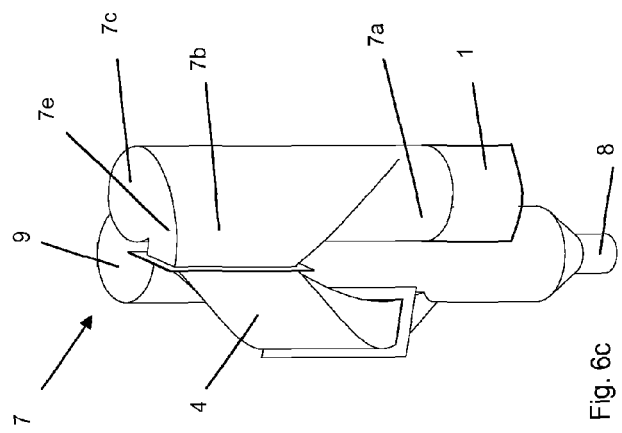

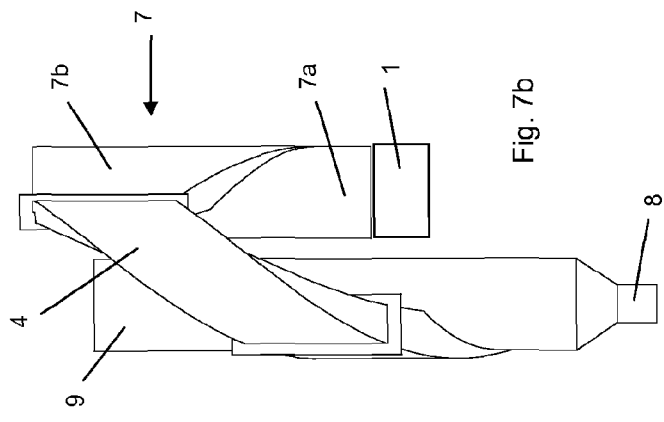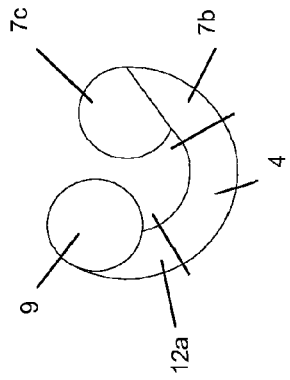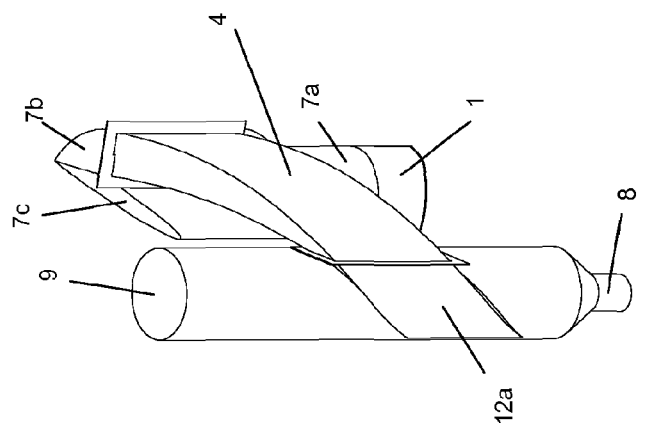

DEVICE FOR SEPARATING A SOLID MATERIAL AND A GAS AND A PLANT FOR CEMENT MANUFACTURE

The invention relates to a device for separating a solid material and a gas, and a plant for cement manufacture.

In the cement and mineral industry, there are known, in particular, systems comprising DC heat exchangers and cyclone separators for the preheating, cooling and/or calcining of fine-grain materials. Mostly, such devices comprise several stages stacked one above the other, the gas flow being directed from the bottom to the top through all stages, whilst the solid material is supplied to the individual stages in the opposite direction. At the end of each stage the solid material is separated from the gas.

The drawback of such systems is that they required enormous headroom and the degree of separation in the cyclone separator is not always satisfactory. For instance, uncontrolled flows often occur in the cyclones, which are caused, for example at the cyclone intake, by superimposition of the incoming gas flow on the swirling stream formed in the cyclone or by reversal of the gas flow direction in the cone of the cyclone. Furthermore, the particles already deposited at the cyclone edge may be reintroduced into the incoming gas flow of the cyclone.

Another problem is that with constructions of different size the centrifugal forces change with the same entry speeds, thus resulting in different separation conditions.

In U.S. Pat. No. 4,318,692 a multistage preheater for cement raw material was therefore proposed, the individual stages of which each consist of an ascending conduit and an adjoining helical and/or spiral conduit. The ascending conduit and the helical and/or spiral conduits are connected with one another via a guide elbow. The helical and/or spiral conduit moreover has a rectangular cross-section and is connected to one side face of a block-form collection chamber. The junction extends here over the whole side face of the block-form collection chamber. The lower part of the collection chamber tapers in the form of a funnel and serves to discharge the solid material, whilst the gas is lead off upwards. The separation degree of this collection chamber is unsatisfactory, however.

The invention therefore addresses the problem of improving the degree of separation of the device for separating a solid material and a gas.

According to the invention, that problem is solved by the features of claim 1.

The device according to the invention for separating a solid material and a gas substantially comprises a. an ascending conduit for conducting a gas-solid material suspension having a solid material supply port for feeding in a solid material and a gas supply port for feeding in a gas,
b. a descending helical and/or spiral conduit, in which the gas-solid material suspension is separated into a solid material flow and a gas flow by centrifugal forces,
c. a diverter head that connects the ascending conduit with the helical and/or spiral conduit, at least one bend being provided in the conduit configuration in the region of the diverter head,
d. connected to one end of the helical and/or spiral conduit a solid material conduit for discharging the flow of solid material and also
e. connected to the end of the helical and/or spiral conduit a gas conduit for discharging the gas flow.

A helical and/or spiral conduit in terms of the invention is understood to mean a conduit that is of helical and/or spiral form at least in sections. The twist of the helical and/or spiral conduit can here extend, in particular, also only over a relatively small angular range of, for example, 90°.

In U.S. Pat. No. 4,318,692 the ascending conduit and the descending helical and/or spiral conduit are connected with one another a via a guide elbow.

To improve the degree of separation of the device, in the trials underlying the invention attempts were made to improve the preliminary separation of the solid material flow and the gas flow already in the helical and/or spiral conduit. At the same time, it was shown that it is an advantage for that purpose if turbulence is generated in the gas-solid material suspension in the region of the diverter head. Whereas in U.S. Pat. No. 4,318,692 the gas-solid material suspension is smoothly guided, according to the invention turbulence is specifically generated by the bend in the conduit configuration, which in the adjoining helical and/or spiral conduit gives rise to an improved pre-separation of solid material flow and gas flow.

Further advantages and embodiments of the invention are the subject of the subsidiary claims.

According to a preferred embodiment of the invention, the bend in the conduit configuration has an angle $\leq 120°$ when viewed from the side. Furthermore, a bend that in plan view has an angle $\leq 170°$ may also be provided in the conduit configuration. The bend is preferably designed so that the gas-solid material suspension is diverted at an acute or obtuse angle.

In the region adjoining the ascending conduit the diverter head can have a first cross-sectional shape, and in the region adjoining the helical and/or spiral conduit, a second cross-sectional shape. In this way the ascending conduit can be, for example, round and the helical and/or spiral form can be of angular construction.

In a particular embodiment of the invention, the diverter head has a first part connected to the ascending conduit and a second part connected to the helical and/or spiral conduit, the second part of the diverter head being connected to the first part of the diverter head in such a way that the bend in the conduit configuration is produced between the two parts.

The first part of the diverter head can be formed, for example, by a tubular portion of circular cross-section, which at its end remote from the ascending conduit merges into the second part of the diverter head, the second part forming a transition piece from the circular cross-section of the first part to the cross-section of the helical and/or spiral conduit, and the two parts being connected with one another in such a way that the gas-solid material suspension is diverted at an acute and/or obtuse angle.

It is possible for the first part of the diverter head to have a cylindrical peripheral wall and for the second part of the diverter head to be attached in the region of the cylindrical peripheral wall. Furthermore, the first part of the diverter head can be closed off in the direction of flow by an end wall running transversely or obliquely to the direction of flow.

According to a further exemplary embodiment, the helical and/or spiral conduit is connected to the diverter head in such a way that the at least one or a further bend is provided at the junction between the diverter head and the helical and/or spiral conduit.

In addition, a separation chamber connected to the end of the helical and/or spiral conduit can be provided, to which the solid material conduit for discharging the solid material flow and the gas conduit for discharging the gas flow are connected.

The above-described device for separating a solid material and a gas is also suitable for stacked arrangement in a plurality of stages. Here, the gas conduit of one stage merges into the ascending conduit of the next higher stage and the solid material conduit of a stage opens out into the ascending conduit of the next lower stage. In this way, the solid material can be conducted from top to bottom through the individual stages and be brought into contact with the gas flow guided in the opposite direction. The device for separating a solid material and a gas can be used in particular for a pre-heater and/or a calciner of a plant for cement manufacture with pre-heater, calciner and kiln.

Figure 9:
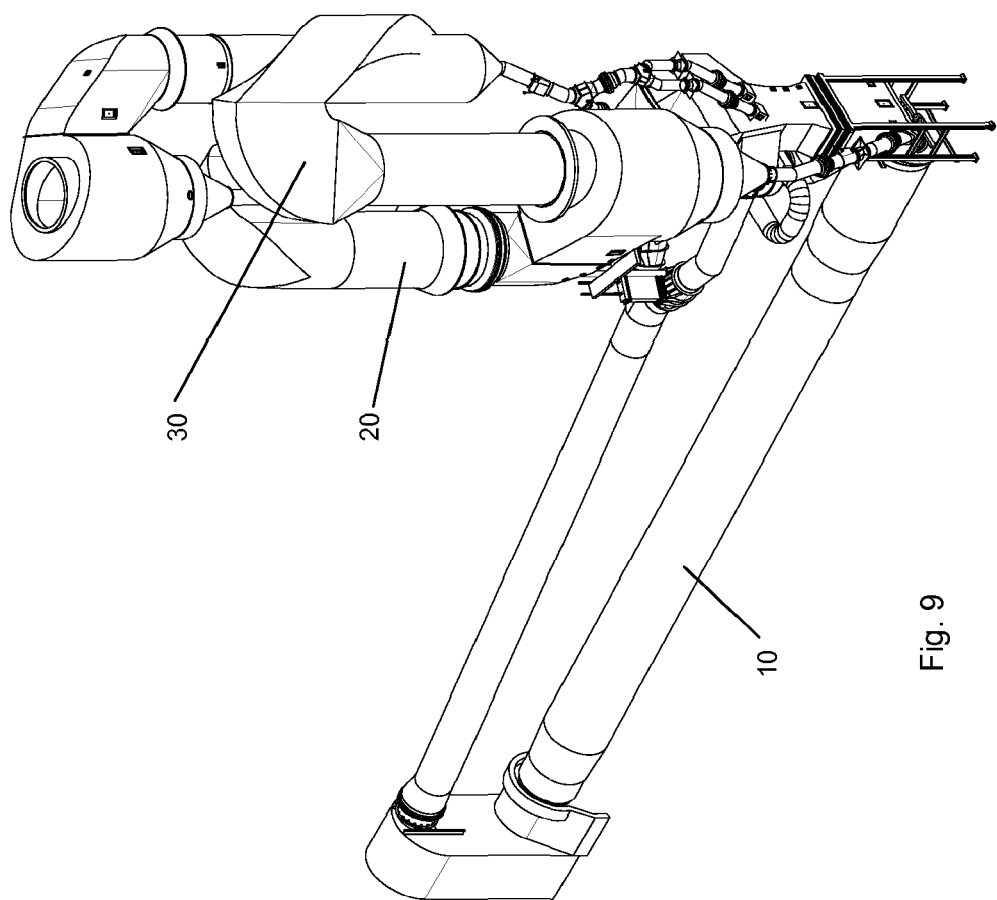

Further advantages and embodiments of the invention are explained in detail hereafter by means of the description of a number of exemplary embodiment and the drawings, in which:

FIGS. 1a to 1c show different views of a device for separating a solid material and a gas according to a first exemplary embodiment, FIGS. 2a to 2c show different views of a device for separating a solid material and a gas according to a second exemplary embodiment, FIGS. 3a to 3c show different views of a device for separating a solid material and a gas according to a third exemplary embodiment, FIGS. 4a to 4c show different views of a device for separating a solid material and a gas according to a fourth exemplary embodiment, FIGS. 5a to 5c show different views of a device for separating a solid material and a gas according to a fifth exemplary embodiment, FIGS. 6a to 6c show different views of a device for separating a solid material and a gas according to a sixth exemplary embodiment, FIGS. 7a to 7d show different views of a device for separating a solid material and a gas according to a seventh exemplary embodiment, FIG. 8 shows a side view of preheater, and FIG. 9 shows a three-dimensional representation of a plant for cement manufacture.

The device illustrated in FIGS. 1a to 1c for separating a solid material and a gas is, for example, a device for preheating, cooling and/or calcining fine-grain materials in cement manufacture. It consists substantially of an ascending conduit 1 for conducting a gas-solid material suspension having a solid material supply port 2 for feeding in a solid material and a gas supply port 3 for feeding in a gas, as well as a descending helical and/or spiral conduit 4, in which the gas-solid material suspension is separated into a solid material flow 5 and a gas flow 6 by centrifugal forces. Furthermore, a diverter head 7 is provided, which connects the ascending conduit 1 to the helical and/or spiral conduit 4. The end of the helical and/or spiral conduit 4 is connected to a solid material conduit 8 for discharging the solid material flow 5 and to a gas conduit 9 for discharging the gas flow 6.

The diverter head 7 has a first part 7a connected to the ascending conduit 1 and a second part 7b connected to the helical and/or spiral conduit 4, the second part 7b of the diverter head 7 being joined to the first part 7a in such a way that between the two parts a first bend 10 is produced in the conduit configuration. In the side view according to FIG. 1a, the bend 10 in the conduit configuration has an angle $\alpha \leq 160°$.

The first part 7a of the diverter head can be formed, for example, by a tubular portion of circular cross-section, which in the exemplary embodiment illustrated corresponds to the diameter of the ascending conduit 1. The second part 7b joined laterally to the tubular portion of the first part 7a represents a transition piece from the circular cross-section of the first part to the cross-section of the helical and/or spiral conduit 4. In the exemplary embodiment illustrated, both parts 7a, 7b are joined to one another in such a way that the gas-solid material suspension is diverted at an obtuse angle.

In addition to the first bend 10, in the region of the junction between the diverter head 7 and the helical and/or spiral conduit 4 a second bend 11 is provided. The two bends 10, 11 promote the separation of the solid material flow and the gas flow, which are discharged at the end of the helical and/or spiral conduit 4 via the solid material conduit 8 and the gas conduit 9 respectively.

In the exemplary embodiment illustrated, connected to the end of the helical and/or spiral conduit 4 there is provided a separation chamber 12, to which the solid material conduit 8 for discharging the solid material flow 5 and the gas conduit 9 for discharging the gas flow 6 are connected. The separation chamber 12 is of cylindrical construction in the opening region of the helical and/or spiral conduit 4 and merges upwards into the gas conduit 9. Adjoining the separation chamber 12 from below is a part 12a tapering in a funnel shape, to which the solid material conduit is connected. The helical and/or spiral conduit 4 opens preferably tangentially at an angle $\beta$ to the horizontal of at least 30° into the separation chamber 12.

Within the scope of the invention, other configurations of the separation chamber 12 are also possible.

In the description of the further exemplary embodiments, the same reference numerals have been used for identical components.

The exemplary embodiment according to FIGS. 2a to 2c corresponds substantially to the exemplary embodiment described above and differs only in that the second part 7b of the diverter head 7 in plan view is not straight but curved. The curvature of the second part 7b of the diverter head 7 then continues in the helical and/or spiral conduit 4. The centrifugal forces thus act already in this region of the diverter head on the gas-solid material suspension. Otherwise, consistent with the previous exemplary embodiment, in this exemplary embodiment a first bend 10 is provided between the two parts 7a, 7b of the diverter head, and a second bend 11 is provided in the region of the junction between the diverter head 7 and the helical and/or spiral conduit 4.

In the third exemplary embodiment according to FIGS. 3a to 3c, the second part 7b of the diverter head 7 is no longer attached obliquely upwardly to the end of the first part 7a, but obliquely downwardly in the direction of flow and laterally.

The first part 7a of the diverter head 7 again has a cylindrical circumferential wall, to which the second part 7b is tangentially attached at an angle $\alpha \leq 90°$. This junction point then also represents the bend 10 in the conduit configuration. The first part 7a of the diverter head 7 extends a little further above the junction point 7b and is then closed off by an end wall 7c running transversely to the direction of flow.

The fourth exemplary embodiment according to FIGS. 4a to 4c differs from the third exemplary embodiment in that the second part 7b of the diverter head 7 is directed not downwards but upwards.

The fifth exemplary embodiment according to FIGS. 5a to 5c again corresponds substantially to the third exemplary embodiment. The difference is that the first part 7a is not extended beyond the junction point of the second part 7b, but is closed off by this, so that the upper end face 7c of the first part 7a runs approximately in a plane with the upper limiting wall of the second part 7b (see FIG. 5a).

In the sixth exemplary embodiment according to FIGS. 6a to 6c, the first part 7a of the diverter head 7 is again in the form of a tubular portion of circular cross-section, to which the second part 7b is tangentially connected. The second part 7b has a substantially rectangular cross-section and in the plan view according to FIG. 6b is of curved construction. Its lower limiting wall 7d is ascending and its upper limiting wall 7e is oriented substantially horizontally or transversely to the centre line of the first part 7a. The obliquely upwardly running lower limiting wall 7d in turn produces a bend 10 for the flow. A further bend 11 is provided at the junction point with the helical and/or spiral conduit 4.

The helical and/or spiral conduit 4 opens out into the separation chamber 12, which in the exemplary embodiment illustrated comprises a curved portion 12a, which adjoins the helical and/or spiral conduit 4, this portion assuming and continuing the curved course of the helical and/or spiral conduit 4 and finally opening into a cylindrical part 12b of the separation chamber, to the bottom of which the solid material conduit 8 is connected and to the top of which the gas conduit 9 is connected.

A variant of the seventh exemplary embodiment is illustrated in FIGS. 7a to 7d. This variant differs only in that the end face 7c of the tubular first part 7a is oriented not transversely to the direction of flow (see FIGS. 6a to 6c), but obliquely in the direction of the second part 7b. This obliquely arranged end face 7c, in conjunction with the obliquely upwardly running second part 7b in the lower region, forms the first bend in the conduit configuration. The second bend is again formed in the region of the junction point with the helical and/or spiral conduit 4.

Within the scope of the invention it is possible for the radius and/or inclination and/or the cross-sectional shape and/or the cross-sectional size of the helical and/or spiral conduit 4 to change in the direction of flow of the gas-solid material suspension. In this way, on the one hand the pre-separation of the gas-solid material suspension in the region of the helical and/or spiral conduit can be influenced, and on the other hand the helical and/or spiral conduit 4 can be adapted to external conditions. This is especially advantageous when several stages are nested in one another and arranged above one another.

The radius, inclination, cross-sectional shape and/or the cross-sectional dimension can vary abruptly in the direction of flow and/or at least in one section also continuously. Thus, for example, a reduction in radius causes an increase in the centrifugal force, whereas an increase in radius corresponds to a reduction in centrifugal force. By changing the cross-sectional shape and dimension, the flow speed can be influenced.

The above-described devices are preferably used to carry out chemical and/or physical reactions between a solid material and a gas, in particular for the preheating, cooling and/or calcining of fine-grain materials, wherein a plurality of stages stacked one above the other can be provided. Here, the gas conduit of one stage merges into the ascending conduit of the next higher stage and the solid material conduit of a stage opens out into the ascending conduit of the next lower stage.

In the following, a device having three stages I, II, III is described by means of FIG. 8, which shows, for example, a three-stage preheater for cement raw material. The individual stages are indicated schematically here. They can be in the form of either one or more of the above described exemplary embodiments. It is thus in particular possible for the individual stages I, II, III to be of different construction.

In such a multi-stage arrangement, a solid material to be treated is fed to the uppermost stage III via a solid material conduit 8''', and is discharged as treated solid material 5, for example, pre-heated solid material, from the lowermost stage I. While the solid material is thus guided from top to bottom through the three stages, the gas flows through the arrangement in the opposite direction. The gas 6 fed in at the lowermost stage is for example, the hot waste gas of a kiln or a calciner. The gas 6'' discharged in the third stage via the gas conduit 9'' is, for example for dust removal, supplied to a filter or to a downstream high-efficiency separator. The treated solid material passes, for example, into a calciner or a kiln for further processing. The construction of the gas-solid material suspension conduit with an ascending conduit 1 and a descending helical and/or spiral conduit 4 enables the three stages to be very compact and arranged nested in one another. The helical and/or spiral conduits 4, 4', 4'' can furthermore be in the form of two successive stages alternately twisted to the left and to the right.

FIG. 9 finally shows a three-dimensional representation of a plant for heat-treating fine-grain material during cement manufacture, having a rotary kiln 10, a calciner 20 and a preheater 30. The calciner 20 and/or the preheater 30 can here be constructed according to the exemplary embodiments described in FIGS. 1 to 8. It is also possible for the individual features of the different exemplary embodiments to be combined with one another.

The invention claimed is:

1. A device for separating a solid material and a gas comprising,
   a. an ascending conduit for conducting a gas-solid material suspension having a solid material supply port for feeding in a solid material and a gas supply port for feeding in a gas,
   b. a descending helical and/or spiral conduit, in which the gas-solid material suspension is separated into a solid material flow and a gas flow by centrifugal forces,
   c. a diverter head that connects the ascending conduit with the helical and/or spiral conduit,
   d. connected to the end of the helical and/or spiral conduit a solid material conduit for discharging the flow of solid material and also
   e. connected to the end of the helical and/or spiral conduit a gas conduit for discharging the flow of gas,
   wherein a junction region to the ascending conduit the diverter head has a first cross-sectional shape and in the junction region to the helical and/or spiral conduit has a second cross-sectional shape and in that in a region of the diverter head at least one bend is provided in a conduit configuration.

2. A device according to claim 1, wherein the bend in the conduit configuration has an angle α, said angle <160° in side view.

3. A device according to claim 1, wherein the bend is designed in such a way that the gas-solid material suspension is diverted at an acute or obtuse angle.

4. A device according to claim 1, wherein the diverter head comprises a first part connected to the ascending conduit and a second part connected to the helical and/or spiral conduit, the second part of the diverter head being connected to the first part of the diverter head in such a way that the bend in the conduit configuration is produced between the two parts.

5. A device according to claim 4, wherein the first part of the diverter head is formed by a tubular portion of circular cross-section, which at its end remote from the ascending conduit merges into the second part of the diverter head, the second part forming a transition piece from the circular cross-section of the first part to the cross-section of the helical and/or spiral conduit, and the two parts being connected with one another in such a way that the gas-solid material suspension is diverted at an acute and/or obtuse angle.

6. A device according to claim 4, wherein the first part of the diverter head has a cylindrical peripheral wall and the second part of the diverter head is attached in the region of the cylindrical peripheral wall.

7. A device according to claim 6, wherein the first part of the diverter head is closed off in the direction of flow by an end wall running transversely or obliquely to the direction of flow.

8. A device according to claim 1, wherein the helical and/or spiral conduit is connected to the diverter head in such a way that the at least one or a further bend is provided at the junction between the diverter head and the helical and/or spiral conduit.

9. A device according to claim 1, wherein a separation chamber connected to the end of the helical and/or spiral conduit is provided, to which the solid material conduit for discharging the solid material flow and the gas conduit for discharging the gas flow are connected.

10. A device according to claim 1, wherein a plurality of stages stacked one above the other are present, each comprising an ascending conduit, a helical and/or spiral conduit adjoining it, as well as a solid material conduit connecting to the end of the helical and/or spiral conduit, and a gas conduit, the gas conduit of one stage merging into the ascending conduit of the next higher stage and the solid material conduit of a stage opening out into the ascending conduit of the next lower stage.

11. A plant for cement manufacture, having a preheater, a calciner and a kiln, the preheater and/or the calciner having a device according to claim 1.

* * * * *